Figure 1:
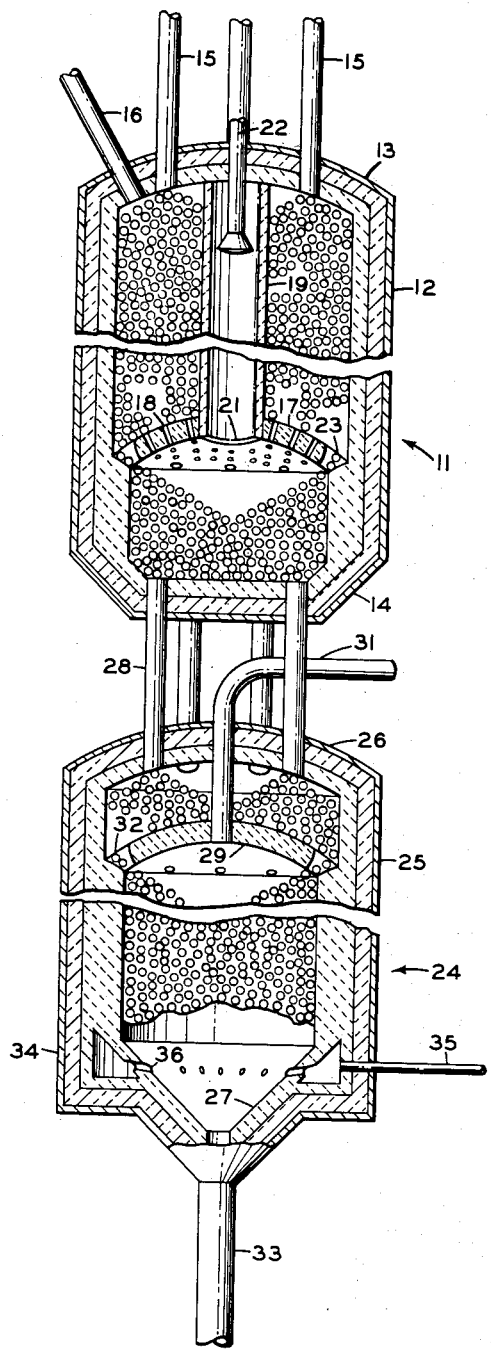

Oct. 4, 1955 R. A. FINDLAY 2,719,818
MEANS AND METHOD FOR CONVERTING HYDROCARBONS
WITH THE USE OF HEATED PEBBLES
Filed Nov. 8, 1951

INVENTOR.
R. A. FINDLAY
BY *Hudson and Young*
ATTORNEYS

United States Patent Office 2,719,818
Patented Oct. 4, 1955

2,719,818

MEANS AND METHOD FOR CONVERTING HYDROCARBONS WITH THE USE OF HEATED PEBBLES

Robert A. Findlay, Bartlesville, Okla., assignor to Phillips Petroleum Company, a corporation of Delaware Application November 8, 1951, Serial No. 255,458

8 Claims. (Cl. 196—55)

This invention relates to pebble heater apparatus. In one of its more specific aspects, it relates to improved means for removing fines from a pebble heater chamber. In another of its more specific aspects, it relates to an improved pebble reaction chamber for the conversion of hydrocarbons. In another of its more specific aspects, it relates to the conversion of hydrocarbons in pebble heater apparatus.

Apparatus of the so-called "pebble heater" type has been utilized in recent years for the purpose of heating fluids to elevated temperatures. Such apparatus is especially suited for use in temperature ranges above those at which the best available high temperature structural alloys fail. Thus, such equipment may be used for superheating steam or other gases and for the pyrolysis of hydrocarbons to produce valuable products such as ethylene and acetylene, as well as for other reactions and purposes. Conventional pebble heater-type apparatus includes two refractory-lined contacting chambers disposed one above the other and connected by a refractory-lined passageway or pebble throat of relatively narrow cross section.

Refractory solids of flowable size and form, called "pebbles," are passed continuously and contiguously through the system, flowing by gravity through the uppermost chamber, the throat, and the lowermost chamber, and are then conveyed to the top of the uppermost chamber to complete the cycle.

Solid heat exchange material which is conventionally used in pebble heater apparatus is generally called "pebbles." The term "pebbles" as used herein denotes any solid refractory material of flowable size and form having strength which is suitable to carry large amounts of heat from the pebble heating chamber to the gas heating chamber without rapid deterioration or substantial breaking. Pebbles conventionally used in pebble heater apparatus are ordinarily substantially spherical in shape and range from about ⅛ inch to about 1 inch in diameter. In a high temperature process, pebbles having a diameter of between about ¼ to ⅜ inch are preferred. The pebbles must be formed of a refractory material which will withstand temperatures at least as high as the highest temperature attained in the pebble heating chamber. The pebbles must also be capable of withstanding temperature changes within the apparatus. Refractory materials, such as metal alloys, ceramics, or other satisfactory material may be utilized to form such pebbles. Silicon carbide, alumina, periclase, beryllia, Stellite, zirconia, and mullite may be satisfactorily used to form such pebbles or may be used in admixture with each other or with other materials. Pebbles formed of such materials, when properly fired, serve very well in high temperatures, some withstanding temperatures up to about 3500° F. Pebbles which are used may be either inert or catalytic as used in any selected process.

The pebbles are heated in one of the chambers (preferably the upper one) by direct contact therein with hot gases, usually combustion products, to temperatures generally in the range of 1400° F. to 3200° F. The hot pebbles are thereafter contacted with the fluid to be superheated or reacted, as the case may be, in the other chamber. Generally, pebble inlet temperatures in the second chamber are about 100° F. to 200° F. below the highest temperature of the pebbles within the first chamber. In processes for the production of ethylene from light hydrocarbons, such as ethane or propane, the pebble temperature in the reaction chamber is usually in the range of 1200° F. to 1800° F. For the production of acetylene by pyrolysis of hydrocarbons, temperatures in the range of 1800° F. to 3000° F. are desirable.

In the operation of many pebble heater apparatus, pebble fines tend to be deposited out of the gravitating pebble mass and collect in stagnant areas within the pebble chambers. This is particularly true when the interior structure of the individual pebble chambers is such that the bottom of the pebble chamber does not conform at least to the normal angle of repose of the pebbles, extending downwardly and inwardly toward the pebble outlet conduit.

I have devised a means for preventing the accumulation of pebble fines in the lower portion of pebble chambers while retaining the desirable features of chambers which would inherently otherwise cause the accumulation of such fines.

Another problem which is encountered in the operation of pebble heater apparatus is the accumulation of coke or carbon on the upper end or dome of the reactor chamber. This accumulation of carbon or coke is believed to be the result of hot reaction products contacting the reactor dome when that dome is at a temperature much lower than that of the reaction products. I have devised a means whereby the dome of the reactor chamber is maintained at substantially the temperature of the gravitating pebbles. The elevated temperature of this pebble dome results in the gasification of any liquid droplets which might come into contact with that dome or in repelling gaseous materials therefrom sufficiently soon to prevent substantial carbon lay-down on the inner surface of the reactor dome.

By at least one aspect of this invention, at least one of the following objects of the invention is attained. An object of this invention is to provide improved pebble heater apparatus. Another object of this invention is to provide improved means for preventing the accumulation of pebble fines in the pebble heater chamber of pebble heater apparatus. Another object of the invention is to provide an improved reaction chamber. Another object of the invention is to provide a reaction chamber in which the reaction zone dome is maintained at a temperature which is substantially that of the incoming pebbles to the reaction chamber. Another object of the invention is to provide an improved method for heating the reaction zone dome. Another object of the invention is to provide an improved method for operating pebble heater apparatus. Other and further objects and advantages will be apparent to those skilled in the art upon study of the accompanying discussion and the drawings.

Broadly speaking, this invention comprises an improved pebble heater chamber having a load supporting perforate dome intermediate its ends so as to divide that chamber into a combustion-soaking zone below the dome and a pebble heating zone above the dome. The perforations in that load supporting dome are of such size as to permit the flow of gaseous materials therethrough but to prevent the gravitation of pebbles therethrough. Those perforations are uniformly distributed over the area of the load supporting dome so as to permit the uniform distribution of gaseous materials through the pebble mass. The load supporting dome is provided at its periphery with pebble conduits which permit the gravitation of pebbles from the periphery of the pebble heating zone into the combustion zone. Pebble fines which normally accumlate in the peripheral bottom portion of the pebble mass in the pebble heating chamber are caused to gravitate through the pebble outlet conduits, on through the pebble heater apparatus, and are removed from the pebble heater system at a point downstream of the reaction chamber.

A plurality of pebble conduits is provided between the bottom of the combustion zone and the top of the reactor chamber. A dome is provided in the upper portion of the reactor chamber so as to divide that chamber into a surge zone above the dome and a reaction zone below the dome. The hot pebbles within the surge zone provide heat for raising the temperature of the dome within the reaction chamber.

Figure 2:
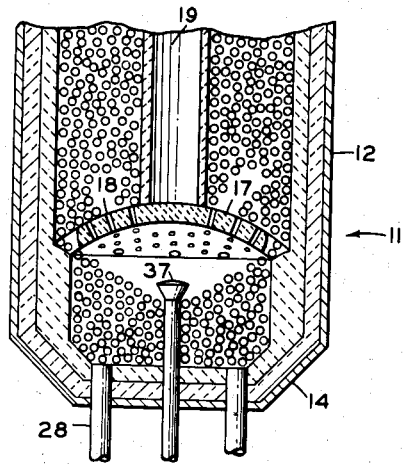
Figure 3:
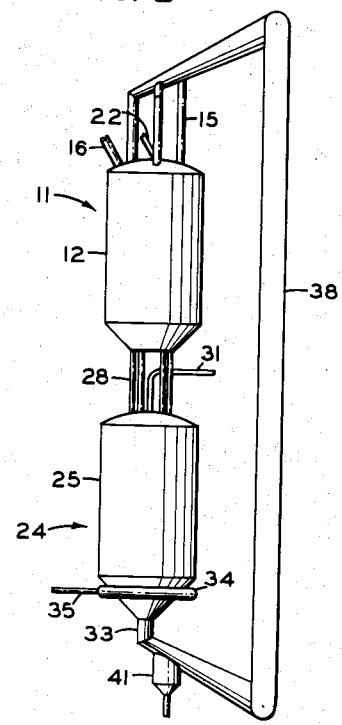

Better understanding of this invention will be obtained upon study of the accompanying drawings wherein Figure 1 is a sectional elevation of a preferred form of pebble heater apparatus of this invention. Figure 2 is a sectional elevation of preferred modification of the pebble heater chamber of this invention. Figure 3 is a schematic illustration of the pebble heater apparatus.

Referring particularly to Figure 1 of the drawings, pebble heater chamber 11 comprises upright elongated shell 12 closed at its upper and lower ends by closure members 13 and 14, respectively. Pebble inlet conduits 15 are provided in the upper portion of chamber 11, preferably uniformly distributed intermediate the axis and the periphery of closure member 13. Gaseous effluent conduit 16 is provided in the upper portion of chamber 11, preferably in closure member 13. Load supporting dome 17 is provided with a plurality of gaseous material conduits 18, which conduits are uniformly distributed over the surface of the dome. A hollow imperforate core 19 is axially provided within chamber 11 and extends upwardly from load supporting dome 17, upon which it is supported, to closure member 13. An opening 21 is provided through load supporting dome 17 so as to correspond with the opening through the length of core 19. Burner 22 extends through closure member 13 into the interior of core 19. A plurality of pebble conduits 23 is provided about the periphery of load supporting dome 17. Pebble conduits 23 are uniformly distributed around the periphery of dome 17 so as to permit the uniform gravitation of pebbles through chamber 11. Load supporting dome 17 is spaced from closure member 14 sufficiently to permit the accumulation of pebbles in the lower portion of the combustion-soaking zone.

Reaction chamber 24 comprises upright elongated shell 25 closed at its upper and lower ends by closure members 26 and 27, respectively. A plurality of pebble conduits 28 extend from the bottom of the combustion-soaking zone in chamber 11 through closure member 26 of reactor chamber 24. Disposed below the lower ends of pebble conduits 28 is an imperforate load supporting dome 29 in the upper portion of chamber 24. Load supporting dome 29 is supported at its periphery upon the walls of that chamber. Gaseous effluent conduit 31 extends upwardly from a reaction zone formed below dome 29, preferably through closure member 26 to the exterior of chamber 24. Load supporting dome 29 is provided with a plurality of pebble conduits 32 about its periphery so as to permit the flow of pebbles from the lowest points within the surge zone formed in the upper portion of chamber 24. Pebble outlet conduit 33 is provided in the lower portion of chamber 24 and is preferably axially disposed therein. Bustle ring 34 is provided around the lower portion of chamber 24 preferably around closure member 27. Reactant material inlet conduit 35 extends into the chamber formed within bustle ring 34 and inlet conduits 36 extend from the chamber formed by bustle ring 34 into the lower portion of the chamber formed within shell 25.

Referring particularly to Figure 2 of the drawings, pebble heater chamber 11 is modified by providing a heating gas inlet or burner 37 which extends upwardly through bottom closure 14 of shell 12. In this modification, no opening is necessarily provided through load supporting dome 17 into the interior of core 19 and burner member 22 is likewise not required.

The operation of pebble heater apparatus will be more easily understood upon reference to Figure 3 of the drawings. Pebbles are introduced into the upper portion of chamber 11 through a plurality of pebble inlet conduits 15. The pebbles so introduced into chamber 11 form a contiguous gravitating mass within that chamber. Gaseous heating material is introduced into the chamber formed below load supporting dome 17 either through inlet 22 or through inlet 37. The gaseous heating material which is at a temperature well above the temperature required for the desired reaction within reaction chamber 24 is distributed within the zone below load supporting dome 17 and passes upwardly through conduits 18 in that dome countercurrently through the gravitating mass of pebbles in the annular chamber formed within shell 12. After the gaseous material gives up its heat to the gravitating pebbles in the direct heat exchange therewith, that gaseous material is removed through gaseous effluent conduit 16. The pebbles gravitating through the annular heating zone formed within shell 12 flow downwardly and outwardly over the surface of load supporting dome 17 and gravitate through the plurality of peripheral pebble conduits 23 in that dome. A shallow bed of gravitating pebbles is formed in the zone below load supporting dome 17 and is supported by closure member 14. This zone permits the pebbles in that shallow bed to soak in the presence of the hot gaseous heating material thereby obtaining a uniform temperature. The slope of closure member 14 downwardly and inwardly toward the pebble conduits is preferably greater than the angle of repose of pebbles.

The pebbles from chamber 11 are gravitated through pebble conduits 28 into the shallow chamber formed between closure member 26 and load supporting dome 29 of chamber 24. These hot pebbles enter into heat exchange relation with dome 29 and raise that dome to substantially the temperature of the pebbles within that surge zone. The pebbles gravitate outwardly and downwardly over the surface of dome 29 through the plurality of peripheral pebble conduits 32 into the reaction zone formed within chamber 24. Gaseous reactant materials are introduced into the lower portion of the reaction zone formed within the chamber 25 through inlet conduit 35, bustle ring 34, and inlet conduits 36. The gaseous reactant materials pass upwardly through the gravitating mass of hot pebbles within chamber 24 and are raised in the direct heat exchange exchange relation therewith to the temperature required for the reaction thereof. Resulting reaction products are removed from the upper portion of the reaction zone through gaseous effluent conduit 31.

The pebbles are gravitated from the lower end portion of chamber 24 through pebble outlet conduit 33 and are passed through that conduit to elevator means 38. Elevator means 38 may be of a mechanical type such as a screw conveyor or a bucket-type elevator or may be of a gas-lift type. The pebbles are elevated by means of elevator means 38 to the upper portion of chamber 11.

Although this invention has been particularly described in connection with the conversion of hydrocarbon reactant materials, the modification of the pebble heater chamber is a very desirable feature when utilizing the pebble heater apparatus for the purpose of superheating steam or for the fixation of nitrogen. This modification provides pebble outlet conduits from the lowermost points within the pebble heating zone so that pebble fines which normally tend to accumulate in the lowermost points within the chamber are carried on through the system by means of the gravitating pebble mass. When pebble fines accumulate within the system, they quite often are raised to such a temperature that they tend to fuse thereby cutting off a portion of the normal flow of gaseous material through the load supporting dome in the heating chamber. By means of this invention, the desirable feature of a perforate load supporting dome within the heating chamber, i. e., that of uniform distribution of gaseous materials through the gravitating pebble mass, are retained while eliminating the undesirable feature, i. e., that of the accumulation of pebble fines in stagnant areas adjacent the walls of that chamber. Pebble fines are separated from said pebbles and are removed from the system through outlet 41. A pebble feeder, not shown, is provided in conduit 33, generally downstream of outlet 41.

The pebble conveying means between the bottom of chamber 11 and the top of chamber 24 can be a single pebble throat if so desired. If such construction is used, that pebble throat should be axially positioned with respect to the two chambers.

Various other modifications of this invention will be apparent to those skilled in the art upon study of this discussion and the drawings. Such modifications are believed to be within the spirit and the scope of this invention.

I claim:

1. Pebble heater apparatus comprising in combination a first closed, upright, elongated shell; pebble inlet means in the upper end of said shell; gaseous effluent conduit means in the upper end portion of said first shell; a perforate, load supporting dome transversely positioned in the lower portion of said shell, supported at its periphery by said shell; a core, coaxially positioned with respect to said shell and extending from said perforate dome to the top of said shell; heating material inlet means in said shell and communicating with the zone formed below said perforate dome; a plurality of pebble conduits spaced about and at the periphery of said perforate dome, extending between the zone above said dome and the zone below said dome; a second closed, upright elongated shell; pebble conduit means extending between the bottom of said first shell and the top of said second shell; an imperforate, load supporting dome transversely positioned in the upper portion of said second shell, supported at its periphery by said shell and spaced from the top of that shell; a plurality of pebble conduits spaced about and at the periphery of said imperforate dome, extending between the zone above said dome and the zone below said dome; gaseous effluent conduit means extending from the upper end of the zone below said imperforate dome to the exterior of said second shell; reactant material inlet means in the lower portion of said second shell; pebble outlet conduit means in the lower end of said second shell; and an elevator connected to said pebble outlet conduit means at its lower end, and to said pebble inlet means at its upper end.

2. The pebble heater of claim 1, wherein said core is hollow; said heating material inlet means extends into said hollow core at the top of said first shell; and a heating material inlet extends from said hollow core through said perforate dome into said zone below said perforate dome.

3. The pebble heater of claim 1, wherein said heating material inlet means extends through said shell into the zone below said perforate dome.

4. The pebble heater of claim 1, wherein said gaseous effluent conduit means extends from the axial portion of the chamber formed within said second shell, through said imperforate dome to the exterior of said shell.

5. The process for pyrolytically converting hydrocarbons which comprises in combination the steps of gravitating pebbles as a contiguous annular mass through a pebble heating zone; passing hot gaseous heat exchange material in direct heat exchange and countercurrent to the flow of said pebbles, wherein said pebbles are raised to a temperature at least 100° F. higher than the desired pebble inlet temperature to a reaction zone; gravitating said hot pebbles together with any pebble lines outwardly to the periphery of said pebble heating zone and downwardly to a soaking zone; subjecting said hot pebbles to direct heat exchange with said hot gaseous heat exchange material in said soaking zone; gravitating said hot pebbles and pebble fines into a surge zone in the upper portion of reaction chamber; passing heat from said pebbles in said surge zone by indirect heat exchange into the upper end of a reaction zone; gravitating said hot pebbles and pebble fines outwardly to the periphery of said surge zone and downwardly into and through said reaction zone; passing reactant materials upwardly through said reaction zone in direct heat exchange with said hot gravitating pebbles, whereby said reactant materials are raised to reaction temperature; removing gaseous effluent from the upper portion of said reaction zone; gravitating said pebbles and fines from the lower portion of said reaction zone; separating said fines from said pebbles; elevating said pebbles to the upper portion of said pebble heating zone; and removing said fines from the conversion system.

6. Pebble heater apparatus comprising in combination a first closed, upright, elongated shell; pebble inlet means in the upper end of said first shell; gaseous effluent conduit means in the upper end portion of said first shell; a load supporting baffle transversely positioned in the lower portion of said first shell, forming a pebble heating zone thereabove and a combustion-soaking therebelow; a core, coaxially positioned with respect to said first shell and extending from said load supporting baffle upwardly into said pebble heating zone; heating material inlet means in the lower end portion of said first shell; pebble conduit means from said pebble heating zone to said combustion-soaking zone at the periphery of said baffle; a second closed, upright, elongated shell; pebble conduit means extending between the bottom of said first shell and the top of said second shell; an imperforate, load supporting dome transversely positioned in the upper portion of said second shell, supported at its periphery by said second shell and spaced from the top of that shell; pebble conduit means at the periphery of said imperforate dome, extending between the zone above said dome and the zone below said dome; gaseous effluent conduit means extending from the upper end of the zone below said imperforate dome to the exterior of said second shell; reactant material inlet means in the lower portion of said second shell; pebble outlet conduit means in the lower end of said second shell; and elevator conduit means connected to said pebble outlet conduit means at its lower end and to said pebble inlet means at its upper end.

7. An improved reaction chamber of pebble heater apparatus which comprises an upright, elongated shell; pebble inlet means in the upper end of said shell; pebble outlet means in the lower end of said shell; gaseous material inlet means in the lower end portion of said shell; an imperforate, load supporting dome transversely positioned in the upper portion of said shell, supported at its periphery by said shell and spaced from the top of that shell; pebble conduit means at the periphery of said dome communicating between zones above and below said dome; and a gaseous effluent conduit extending from the upper end of the zone below said imperforate dome to the exterior of said shell.

8. The improved reaction chamber of claim 7 wherein said pebble inlet means in the upper end of said shell is offset from the longitudinal axis of said shell and said gaseous effluent conduit extends through the axial portion of said imperforate dome.

(References on following page)

References Cited in the file of this patent

UNITED STATES PATENTS

| | | |
|---|---|---|
| 2,445,092 | Utterback | July 13, 1948 |
| 2,518,842 | Weber | Aug. 14, 1950 |
| 2,530,274 | Weber | Nov. 14, 1950 |
| 2,530,731 | Robinson et al. | Nov. 21, 1950 |
| 2,534,625 | Robinson | Dec. 30, 1950 |
| 2,554,407 | Hepp | May 22, 1951 |
| 2,561,420 | Schutte | July 24, 1951 |
| 2,623,842 | Robinson | Dec. 30, 1952 |